(12) United States Patent
Baldwin

(10) Patent No.: US 9,661,214 B2
(45) Date of Patent: May 23, 2017

(54) DEPTH DETERMINATION USING CAMERA FOCUS

(71) Applicant: Amazon Technologies, Inc., Reno, NV (US)

(72) Inventor: Leo Benedict Baldwin, Cupertino, CA (US)

(73) Assignee: AMAZON TECHNOLOGIES, INC., Reno, NV (US)

( * ) Notice: Subject to any disclaimer, the term of this patent is extended or adjusted under 35 U.S.C. 154(b) by 0 days.

(21) Appl. No.: 15/141,710

(22) Filed: Apr. 28, 2016

(65) Prior Publication Data

US 2016/0248968 A1    Aug. 25, 2016

Related U.S. Application Data

(63) Continuation of application No. 14/790,683, filed on Jul. 2, 2015, now abandoned, which is a continuation of application No. 13/787,608, filed on Mar. 6, 2013, now Pat. No. 9,077,891.

(51) Int. Cl.
*H04N 5/232* (2006.01)
*G06T 7/70* (2017.01)
*G06T 7/50* (2017.01)

(52) U.S. Cl.
CPC ........... *H04N 5/23212* (2013.01); *G06T 7/50* (2017.01); *G06T 7/70* (2017.01); *H04N 5/23293* (2013.01)

(58) Field of Classification Search
None
See application file for complete search history.

(56) References Cited

U.S. PATENT DOCUMENTS

| | | | |
|---|---|---|---|
| 7,221,805 B1 * | 5/2007 | Bachelder | G03B 13/36 348/208.12 |
| 9,077,891 B1 | 7/2015 | Baldwin | |
| 2007/0019883 A1 * | 1/2007 | Wong | G06T 7/0069 382/276 |
| 2008/0267458 A1 | 10/2008 | Laganiere et al. | |
| 2009/0167930 A1 * | 7/2009 | Safaee-Rad | G02B 7/38 348/347 |
| 2009/0310021 A1 * | 12/2009 | Kondo | H04N 5/44513 348/564 |
| 2012/0300114 A1 * | 11/2012 | Isogai | G01S 17/46 348/345 |
| 2013/0010077 A1 * | 1/2013 | Nguyen | G06T 1/0007 348/46 |
| 2013/0033579 A1 * | 2/2013 | Wajs | G02B 7/365 348/46 |
| 2013/0259459 A1 * | 10/2013 | Mick | G03B 13/36 396/121 |

\* cited by examiner

*Primary Examiner* — Sath V Perungavoor
*Assistant Examiner* — Janese Duley
(74) *Attorney, Agent, or Firm* — Polsinelli LLP

(57) ABSTRACT

A computing device can capture a plurality of images using a camera of the device, each image being captured with a different focus setting of the camera. In some embodiments, the capturing the plurality of images can be performed during an autofocus process of the camera. The device can determine depth information, such as a position of relative depth, for each of the plurality of images based on the state of the camera when each image was captured. Depth information for any object(s) in focus in a respective one of the plurality of images can be determined to correspond to the depth information for the respective image.

18 Claims, 13 Drawing Sheets

DEPTH DETERMINATION USING CAMERA FOCUS

CROSS-REFERENCE TO RELATED APPLICATIONS

This application is a continuation of U.S. application Ser. No. 14/790,683, filed Jul. 2, 2015, which is a continuation of U.S. application Ser. No. 13/787,608, filed Mar. 6, 2013, now U.S. Pat. No. 9,077,891. The entire disclosure of each of these prior applications is incorporated herein by reference.

BACKGROUND

Users are increasingly utilizing computing devices for various purposes. A computing device can be used by a user to capture images, check email, browse the Internet, and obtain various types of information. For example, the user can utilize a camera of the computing device to view and capture an image of a real-world scene that is within a field of view of the camera. The scene can include physical objects located at various positions within the scene. Some objects can be located in the real-world scene farther away from the camera of the device as compared to the location of some other object. In one example, the field of view of the camera of the device can include objects such as a street sign in the background, a friend of the user in the foreground, and a logo of a store in between the foreground and the background. Although the street sign, the friend, and the logo are all within the field of view of the camera of the device, it can be difficult for the device to accurately determine which object belongs in the foreground, which object belongs in the background, and which object belongs in between the foreground and the background, in order to focus the camera on the appropriate image or identify the primary object of interest.

BRIEF DESCRIPTION OF THE DRAWINGS

Various embodiments in accordance with the present disclosure will be described with reference to the drawings, in which.

DETAILED DESCRIPTION

Figure 1:
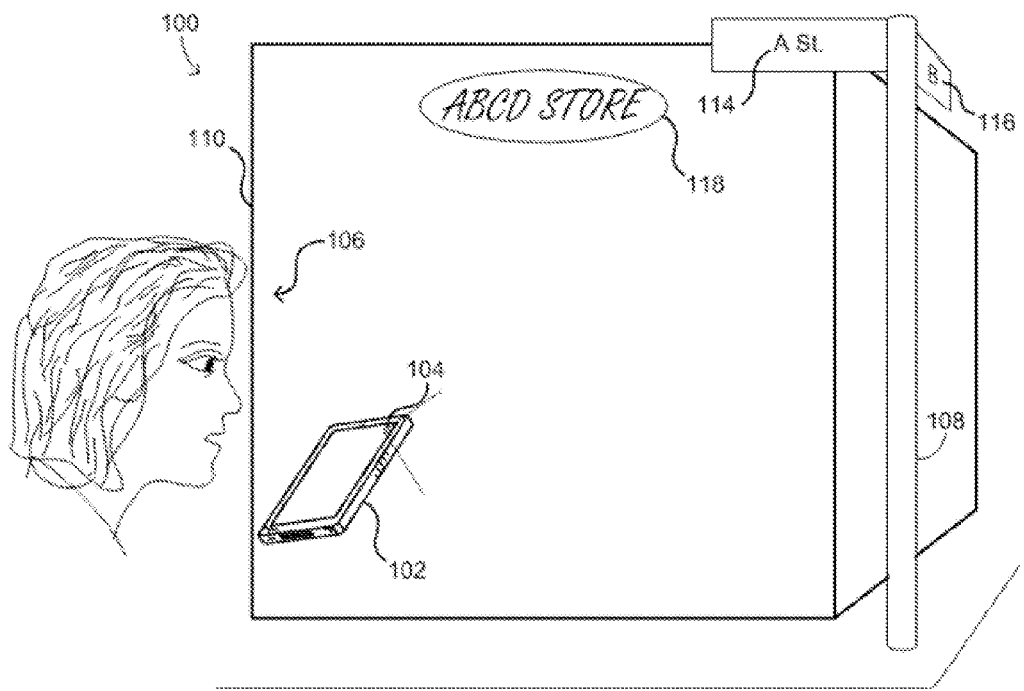
FIG. 1 illustrates an example environment in which aspects of the various embodiments can be utilized.
Figure 1:
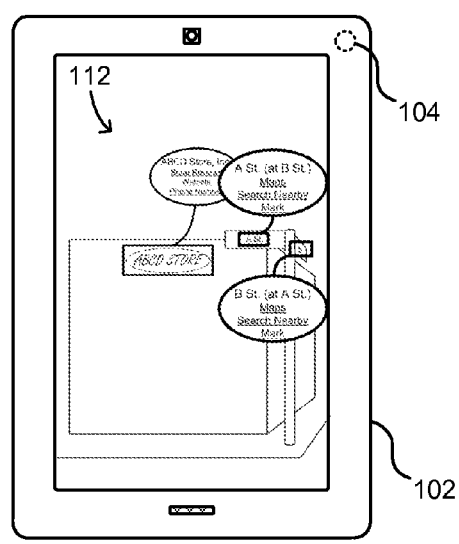

Systems and methods in accordance with various embodiments of the present disclosure overcome one or more of the above-referenced and other deficiencies in conventional approaches to detecting and/or analyzing real-world content using a computing device. In particular, various embodiments of the present disclosure can determine a relative depth for an object with respect to other objects in a field of view of a camera of the computing device, the objects representing physical objects in reality. In some embodiments, the computing device can provide an augmented reality based on the determined relative depths for the objects.

At least some embodiments enable a computing device to capture a plurality of images using a camera of the device, wherein each of the plurality of images (e.g., pictures, video frames, etc.) is captured with a different focus setting of the camera. In some embodiments, the capturing of the plurality of images can be associated with an autofocus process of the camera of the device. Autofocusing typically captures a plurality of images, but discards the images when the process is complete. However, the present disclosure can, in some embodiments, utilize the plurality of images captured during the autofocusing process prior to discarding them.

In one example, a computing device can capture a plurality of images of a scene within a field of view of the camera, wherein each image includes the scene but is captured with a different focus distance of the camera's lens. This can result in each image having a different object(s), subject(s), and/or area(s) of focus. In other words, although each image includes the same scene, each image can have a different object(s), subject(s), and/or area(s) that is relatively sharp (i.e., in focus) while the other portions of the image are relatively blurry (i.e., not as sharp, not in focus).

For the object(s), subject(s), and/or area(s) of focus in a respective one of the plurality of images, depth information can be determined based on the state of the camera when the respective image was captured. In some embodiments, based on the focus setting of the camera, the magnification setting of the camera, and/or other camera state information when the respective image was captured, the computing device can determine a relative depth of the respective image with respect to the other images in the plurality of images. For example, the device can determine that the first image frame from an autofocus process is associated with being farthest away from the camera, whereas the fourth image frame is associated with being closest to the camera, whereas the seventh image frame is the third closest to the camera, and so forth.

Accordingly, in some embodiments, whichever object(s) (if any) is in focus (e.g., substantially sharp) in a respective image can be denoted as having a relative depth corresponding to the relative depth of the respective image. Continuing with the previous example, an object(s) of focus in the first image frame can be denoted as being farthest away from the camera, while an object(s) of focus in the fourth image frame can be denoted as being closest to the camera, and while an object(s) of focus in the seventh image frame can be denoted as being third closest to the camera, and so forth.

Various other functions and advantages are described and suggested below as may be provided in accordance with the various embodiments FIG. 1 illustrates an example environment in which aspects of the various embodiments can be utilized. In the example environment 100 of FIG. 1, there can be a computing device 102 and at least one camera 104 of the computing device 102. A user 106 of the computing device 102 can be at any physical location, such as on the streets, in a store, in a library, at a restaurant, at home, etc. In the example environment of FIG. 1, the user 106 and the computing device 102 can be on A Street, near the intersection of A Street (A St.) and B Street (B St.). At the intersection of A St. and B St., there can be one or more objects, establishments, points of interest, etc., such as a street sign 108 and ABCD Store 110.

The various objects can be located at various positions of depth with respect to one another. For example, from a point of view of the camera of the computing device, the street sign 108 can be closer in depth to the camera than the ABCD Store 110 is. It can be advantageous to determine the positions of depth of at least some of the objects.

The computing device 102 can determine the positions of depth for at least some of the objects utilizing the at least one camera 104. In some embodiments, the positions of depths of the objects can be determined utilizing a single camera. The device 102 can capture images of a scene/view at various focus settings and can determine positions of depth for the objects in the images based on the images captured with various focus settings.

In some embodiments, the computing device 102 can utilize the positions of depth for the objects to provide an augmented reality 112, for example, by rendering/displaying an environment within a field of view of the camera of the computing device and by rendering/displaying elements in conjunction with the environment. For example, the environment can include one or more physical object, such as an image, a product, a book, a person, text, etc. In some embodiments, each element rendered in conjunction with an object can be rendered at a position of depth corresponding to the position of depth of the object.

In FIG. 1, there can be physical objects such as street names "A St." 114 and "B St." 116 on the street sign 108 and a logo 118 for the ABCD Store 110 and. Utilizing object recognition technology (e.g., finding and/or identifying physical objects captured in an image(s) of computing vision using at least in part image processing), the computing device 102 can identify these and other objects and render/display elements in conjunction with these objects. As shown in FIG. 1, the augmented reality 112 can include elements that overlay the environment to provide information about the objects. For example, the computing device 102 can recognize the street names "A St." 114 and "B St." 116, retrieve information about A St. and B St., and render/display graphic elements to provide (and/or provide access to) information about A St. and B St. A graphic element for each of A St. and B St. can identify the street (and street number, cross street, etc.), provide a link to a mapping application showing the location of the street, provide a search function to search for items near the street, enable a mark (e.g., tagging, bookmarking, etc.) of the street, etc.

Similarly, the device 102 can recognize the ABCD Store logo 118. The device 102 can retrieve information about the ABCD Store 110 based at least in part on recognizing the logo 118. (The device 102 can also utilize in part current geolocation information, e.g., via a GPS, to recognize the ABCD Store 110). The device 102 can render/display a graphical element in conjunction (e.g., overlaying) the environment to provide (and/or provide access to) information about the ABCD Store 110, such as providing a link to store reviews (e.g., from a third-party website), providing a link to the website for the ABCD Store 110, providing contact information, providing business hours, providing directions, etc.

Moreover, the device 102 can determine that the objects "A St." 114 and "B St." 116 have a similar position of depth, which is closer to the camera than the ABCD Store logo object 118 is. As such, in some embodiments, the elements for "A St." 114 and "B St." 116 can be rendered/displayed to appear "in front of" (i.e., closer in depth to the camera than) and occlude, if necessary, the element for the ABCD Store logo object 118.

Figure 2:
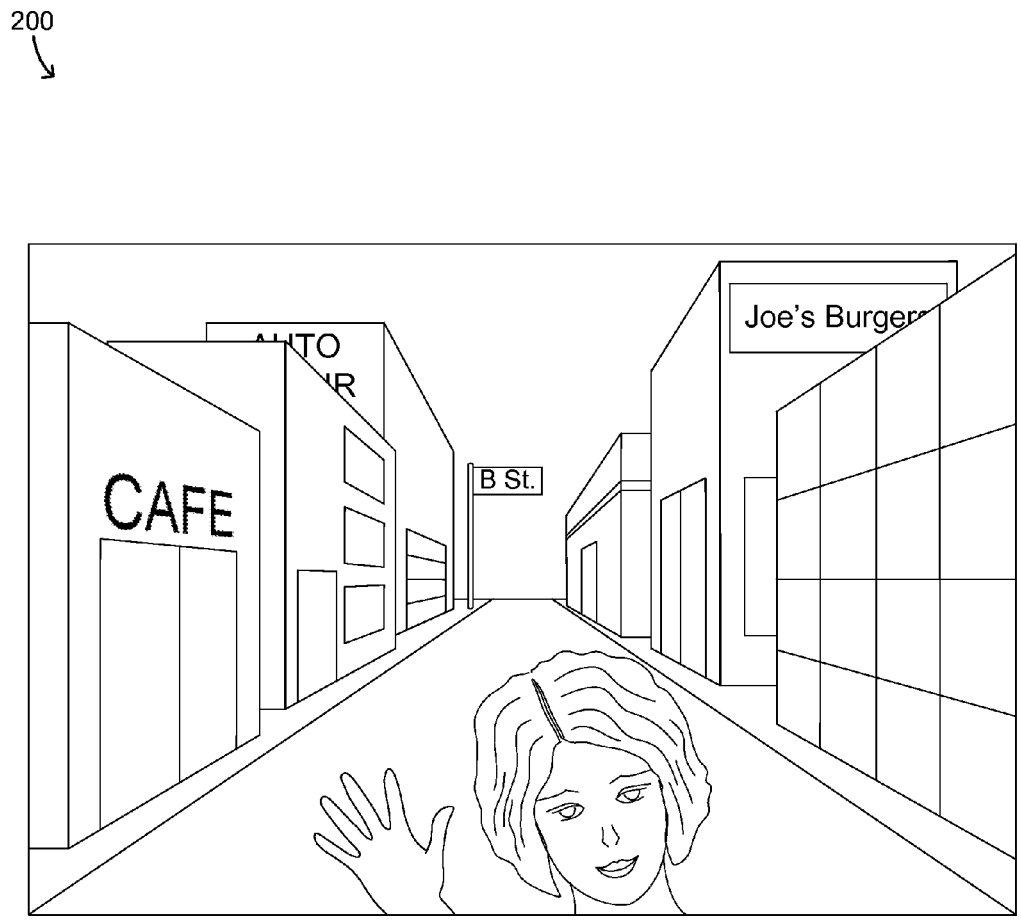
FIG. 2 illustrates an example scene captured by a camera of an example device embodiment to be utilized for depth determination using camera focus.

FIG. 2 illustrates an example scene 200 captured by a camera of an example device embodiment to be utilized for depth determination using camera focus. The example scene 200 of FIG. 2, which includes a view of a street, should be taken as being illustrative in nature and not limiting to the scope of the disclosure. It is contemplated that a person of ordinary skill in the art would recognize that any scene, environment, view, etc., can be captured by a camera in accordance with the present disclosure.

The example computing device embodiment (e.g., 102) can include a camera (e.g., 104). In some embodiments, the camera 104 can perform an autofocus process (i.e., autofocus routine) prior to capturing an image. The autofocus process can use a sensor, a control system, an electronic rangefinder, and/or a motor to focus automatically or on a manually selected point or area in the field of view of the camera.

Examples of camera focus devices include voice coil motor (VCM), piezo-electric motor (PE), stepper motor, micro-electro-mechanical systems (MEMS) and liquid crystal (LQ) devices. Some like PE must incorporate a position sensor, typically a Hall effect sensor that can provide an absolute readout of the lens position that can be correlated to a particular distance to the plane of focus in object space. Some like VCM and LQ do not include a position sensor; in these systems the focal distance must be inferred from state of the focus device, i.e., the drive current or voltage. This may require a calibration step at time of manufacture. In some embodiments, the absolute distance is not of great concern, rather the relative distance is desired, for example to determine superposition. In this case indirect measurement of the focus distance will not require calibration.

The sensitivity of the focal distance determination will be dependent at least in part on two system properties: the depth of field of the lens and the accuracy and/or precision with which the lens position can be determined. The depth of focus is dependent at least in part on the magnification of the lens and on the lens aperture. All of these properties are known when the system is designed and can be used to determine the precision to which focal distance can be determined and optimized if need be.

In some embodiments, the autofocusing process can start by causing an autofocus processor (AFP) to make a small change in the focusing distance of a lens of the camera. The AFP can then read the autofocus (AF) sensor to assess whether or not (and if so, by how much) focus has improved in an image captured at the focusing distance. Next, using the information from the assessment, the AFP can set the lens of the camera to a new focusing distance (e.g., a new focus setting) and capture another image at the new focusing distance. The AFP can iteratively repeat these steps until satisfactory focus has been achieved.

The autofocusing process can usually finish within a short period of time, such as a fraction of a second. The autofocus process results in determining a focus setting of the camera (e.g., a focus distance of the lens of the camera) that provides a satisfactory focus and/or sharpness for an area of interest in the image to be captured. Typically, the images captured (temporarily) at the other focus distances during the autofocus process are discarded. However, in according with various embodiments of the present disclosure, the image captured at the other focus distances during the autofocus process need not be discarded, but instead can be utilized for depth determination.

FIG. 3A through 3D illustrate example images of the example scene 200 of FIG. 2 that can be captured by a camera of a computing device. In some embodiments, the computing device can use the camera to capture a plurality of images, each image captured with a different setting for the camera, such as during an autofocus process. The plurality of images and information about the different settings for the camera used when capturing the plurality of images can be utilized for depth determination.

Figure 3A:
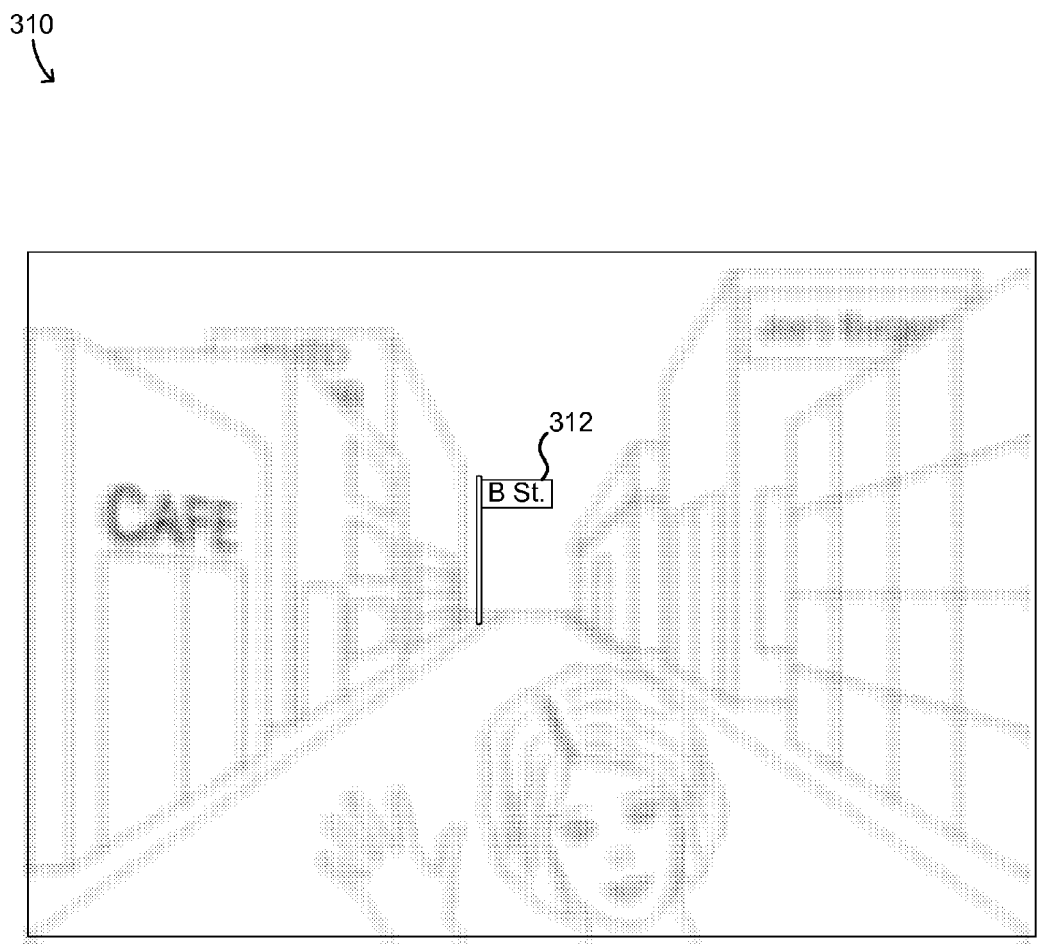
FIG. 3A illustrates an example image captured by a camera of an example device embodiment at a particular focus setting for depth determination using camera focus.

FIG. 3A illustrates an example image 310 captured by a camera of an example device embodiment at a particular focus setting for depth determination using camera focus. The example computing device embodiment can access (e.g., obtain, retrieve) information about a state of the camera when the image 310 was captured. For example, the computing device embodiment can obtain information about a focus setting of the camera (e.g., a focus distance of a lens of the camera), a magnification setting of the camera, a brightness setting associated with the camera, a contrast setting associated with the camera, and/or other information associated with the camera when the image 310 was being captured. The information about the state of the camera when the image 310 was captured can be utilized to determine a depth associated with the image 310 (e.g., a depth associated with an object(s) of focus in the image).

The computing device can determine an object(s), subject(s), area(s), etc., in each of the example images of FIG. 3A through FIG. 3D at which the focus of each image is directed. Which object(s) (and/or subject(s), area(s), etc.) is in focus in an image can depend on the focus setting of the camera (e.g., focus distance of the camera lens) when that image is taken. In the example of FIG. 3A, the object at which the focus of the image 310 is directed is the street sign for "B St." 312.

In some embodiments, the street sign for "B St." 312 can be determined by the computing device to be in focus (which can depend on the particular focus setting of the camera when the image 310 was captured). The computing device can utilize image processing (e.g., edge detection, line detection, feature detection, etc.) to determine that the street sign for "B St." 312 in the image 310 is substantially sharp. In other words, the computing device can utilize image processing to determine that the street sign for "B St." 312 in the image 310 has a sharpness level (e.g., an image quality factor specifying the amount of detail in an image) that exceeds a sharpness threshold (e.g., a threshold that ensures a minimum image quality). For example, the computing device can compare the "B St." street sign 312 with the rest of the image 310 and determine that the "B St." sign 312 is sharp (e.g., in focus) relative to the rest of the image 310, which is blurry (e.g., not in focus). In some embodiments, the sharpness level can be a sharpness score and the sharpness threshold can be a sharpness score threshold.

Figure 3B:
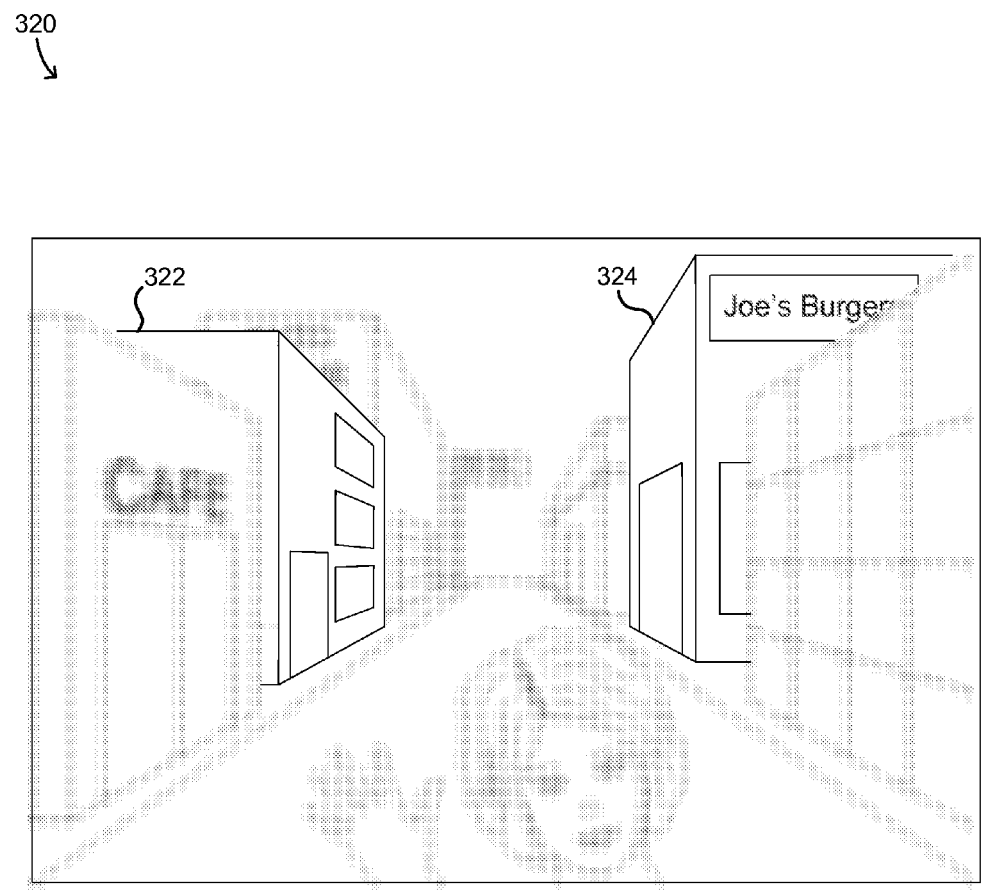
FIG. 3B illustrates an example image captured by a camera of an example device embodiment at a particular focus setting for depth determination using camera focus.

Continuing with the example of FIG. 3A, based on the state of the camera such as the focus distance of the lens of the camera and/or the magnification setting of the camera when image 310 was captured, the computing device can determine that the object of focus in the image 310 (e.g., the "B St." sign 312) has a depth that is substantially far away from the camera; the depth can be a relative depth with respect to at least another image (e.g., relative to another object(s) of focus in another image(s)), such as that shown in FIG. 3B.

FIG. 3B illustrates an example image 320 captured by a camera of an example device embodiment at a particular focus setting for depth determination using camera focus. The example image 320 of FIG. 3B can be of the scene in FIG. 2. The image 320 of FIG. 3B differs from the image 310 of FIG. 3A at least in that the two images are captured with different camera focus settings.

Based on the state of the camera when the image 320 was being captured, the computing device can determine depth information associated with the image 320 (i.e., depth information associated with an object(s) of focus in the image 320). For example, based on the focus setting (e.g., focus distance of the lens) of the camera, the magnification setting of the camera, and/or other state information associated with the camera when the image 320 was being captured, the computing device can determine depth information associated with the image 320 (and/or the object(s) of focus in the image 320).

The computing device embodiment can determine the object(s) of focus in the image 320, wherein the object(s) of focus is dependent at least in part on the focus setting of the camera when the image 320 was captured. For example, the computing device can determine that the objects of focus for the image 320 are the building 322 and the restaurant "Joe's Burgers" 324. The computing device can utilize image processing to determine that the building 322 and the restaurant "Joe's Burgers" 324 are substantially in focus (e.g., substantially sharp) as compared to the rest of the image, which is out of focus (e.g., blurry).

Figure 3C:
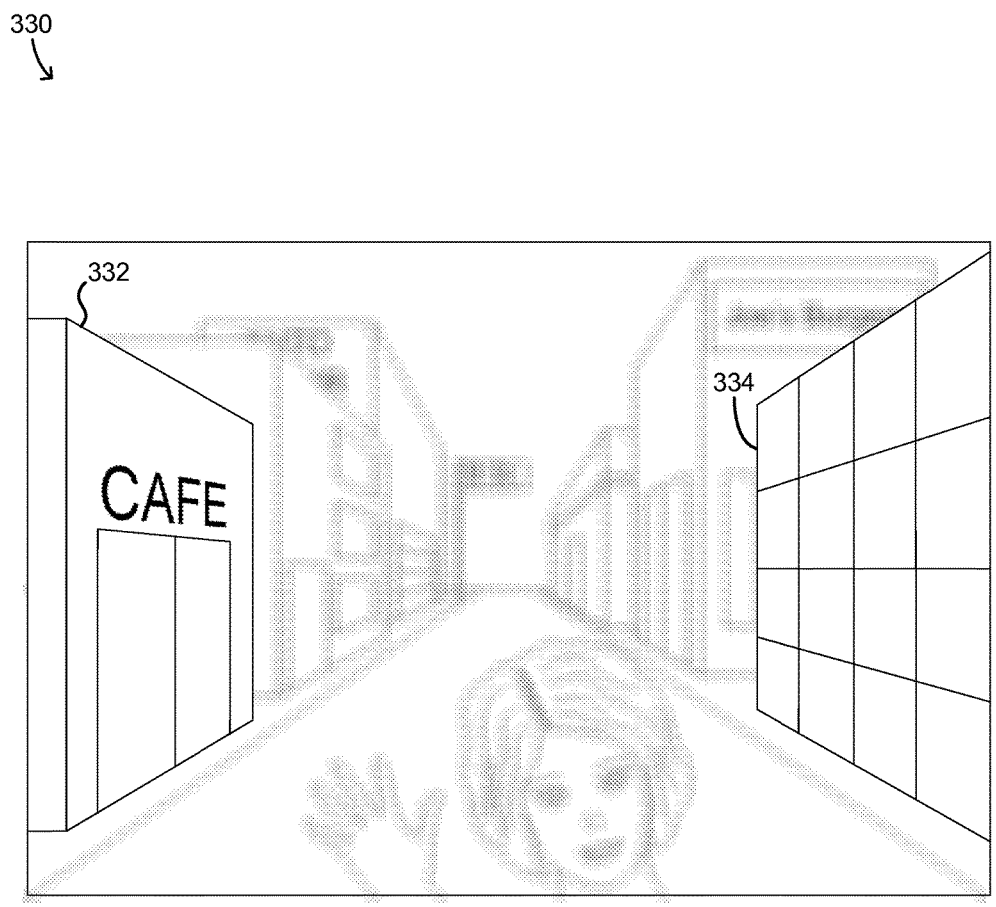
FIG. 3C illustrates an example image captured by a camera of an example device embodiment at a particular focus setting for depth determination using camera focus.

Furthermore, based on the state of the camera when image 320 was captured, the device can determine that the building 322 and "Joe's Burgers" restaurant 324 have a depth that is closer to the camera than the depth of the "B St." sign 312, but father away from the camera than the depth associated with the (object(s) of focus in the) example image 330 of FIG. 3C.

FIG. 3C illustrates an example image 330 captured by a camera of an example device embodiment at a particular focus setting for depth determination using camera focus. The image 330 of FIG. 3C differs from the image 310 of FIG. 3A and the image 320 of FIG. 3B at least in that the images are captured with different focus settings. For example, in FIG. 3C, the focus setting with which the image 330 was captured can result in the objects of focus in the image 330 being the "CAFÉ" 332 and the building 334. In other words, the "CAFE" 332 and the building 334 can be determined by the computing device to have a sharpness level exceeding a sharpness threshold, wherein the sharpness level of the "CAFE" 332 and the building 334 can be dependent at least in part on the focus setting of the camera with which the image 330 was captured.

The computing device can determine depth information associated with the image 330 (i.e., associated with the objects of focus, "CAFE" 332 and building 334, in the image 330). For example, based on state information of the camera when the image 330 was captured, the computing device can determine that the "CAFE" 332 and the building 334 in the image 330 have a depth that is closer to the camera than the depths for the "B St." sign 312 in image 310 and the building 322 and restaurant 324 in image 320, but farther away than the depth associated with the (object(s) of focus in the) example image 340 of FIG. 3D.

Figure 3D:
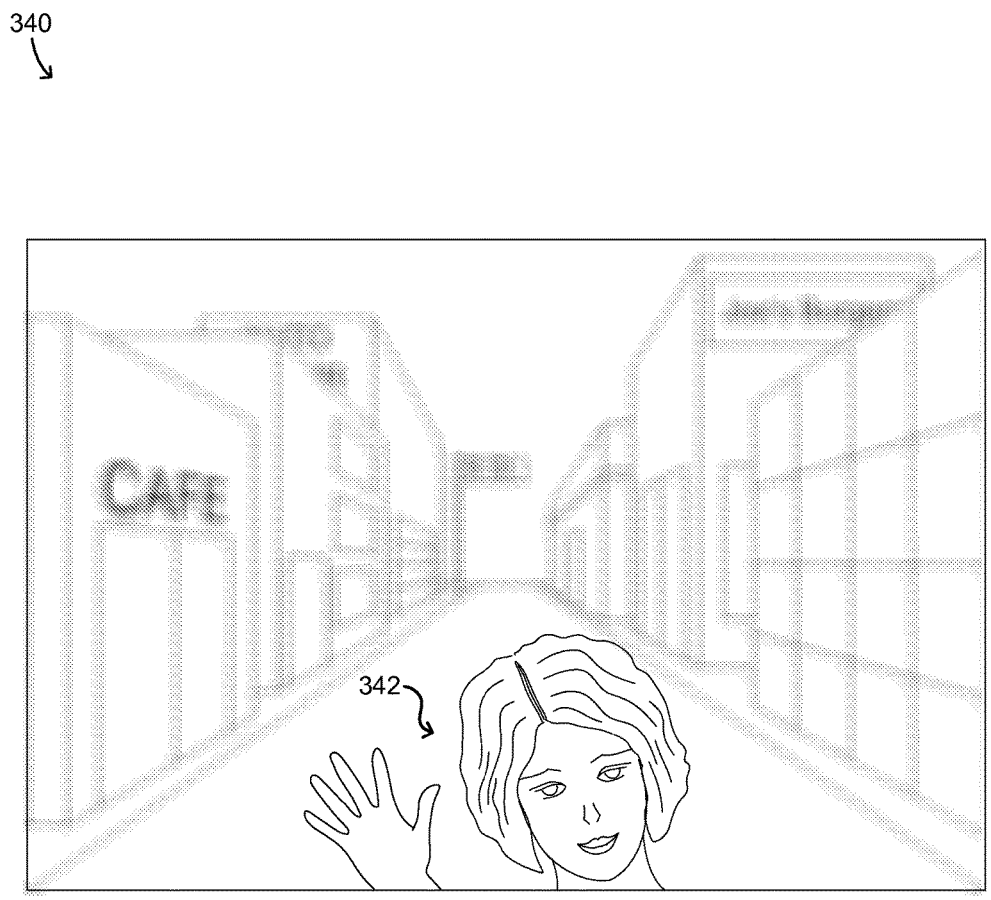
FIG. 3D illustrates an example image captured by a camera of an example device embodiment at a particular focus setting for depth determination using camera focus.

FIG. 3D illustrates an example image 340 captured by a camera of an example device embodiment at a particular focus setting for depth determination using camera focus. In some embodiments, the computing device can determine depth information associated with the image 340 based on the state of the camera when the image 340 was captured.

In addition, the computing device can determine an object(s) of focus in the image 340. In the example of FIG. 3D, the object of focus can be associated with a person, such as "Jane Doe" 342. The computing device can determine "Jane Doe" 342 to be in focus because "Jane Doe" 342 in the image 340 is substantially sharp whereas the rest of the image 340 is blurry.

Further, based on the state of the camera when image 340 was captured, the computing device can determine depth information for "Jane Doe" 342 in image 340. The depth information can indicate that "Jane Doe" 342 in image 340 is the closest in depth to the camera relative to the other objects (e.g., 312, 322, 324, 332, 334) in the other images (e.g., 310, 320, 330).

Figure 4A:
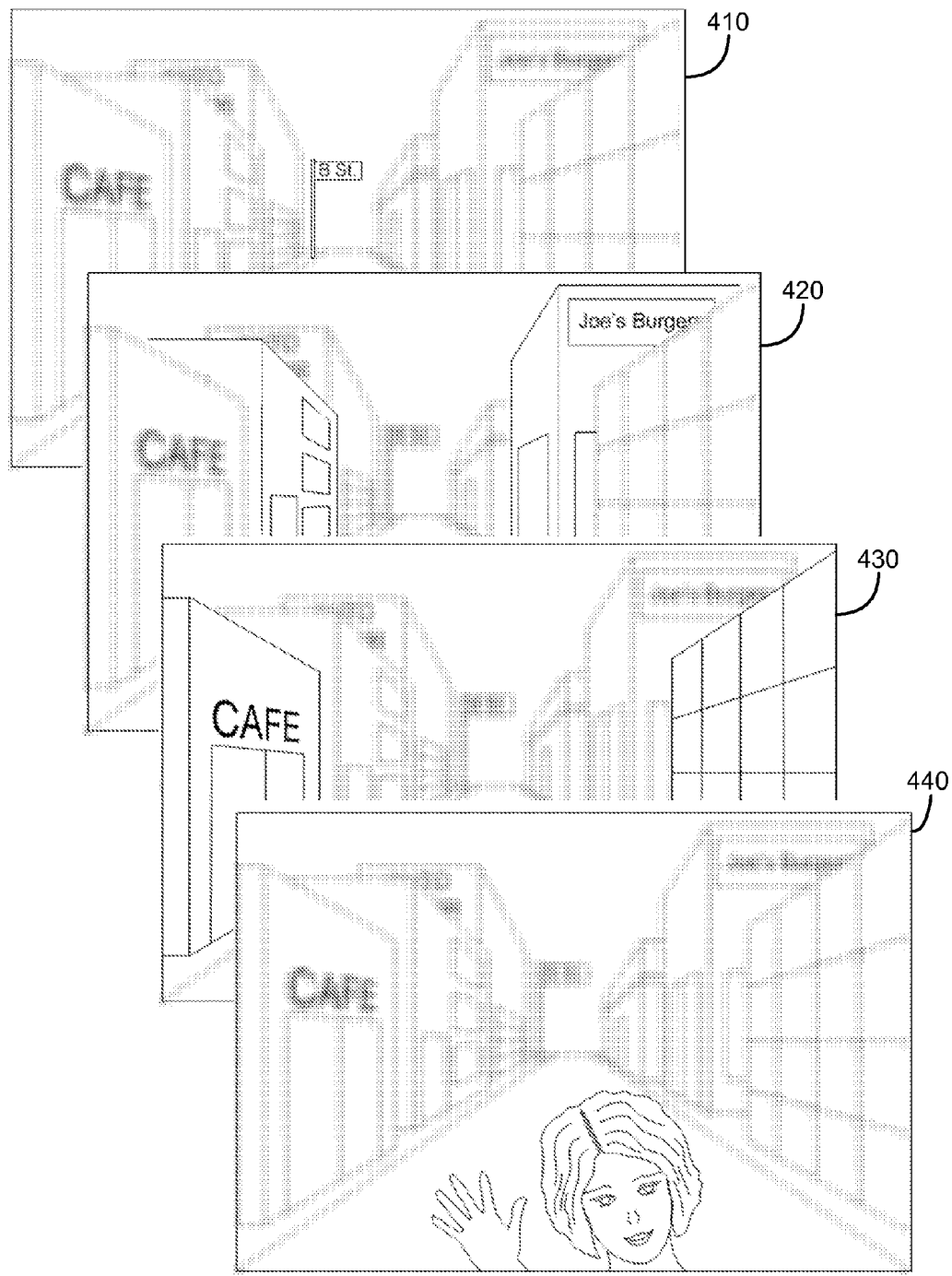
FIG. 4A illustrates a plurality of example images captured by a camera of an example device embodiment at various focus settings for depth determination using camera focus.

FIG. 4A illustrates a plurality of example images captured by a camera of an example device embodiment at various focus settings for depth determination using camera focus. Each of the plurality of example images in FIG. 4 (e.g., 410, 420, 430, 440) can correspond to one of the example images (e.g., 310, 320, 330, 340) shown in FIG. 3A through FIG. 3D, respectively.

In FIG. 4A, the plurality of images are sorted by depth, with the image having the closest object in the front and the image having the farthest object in the back.

Figure 4B:
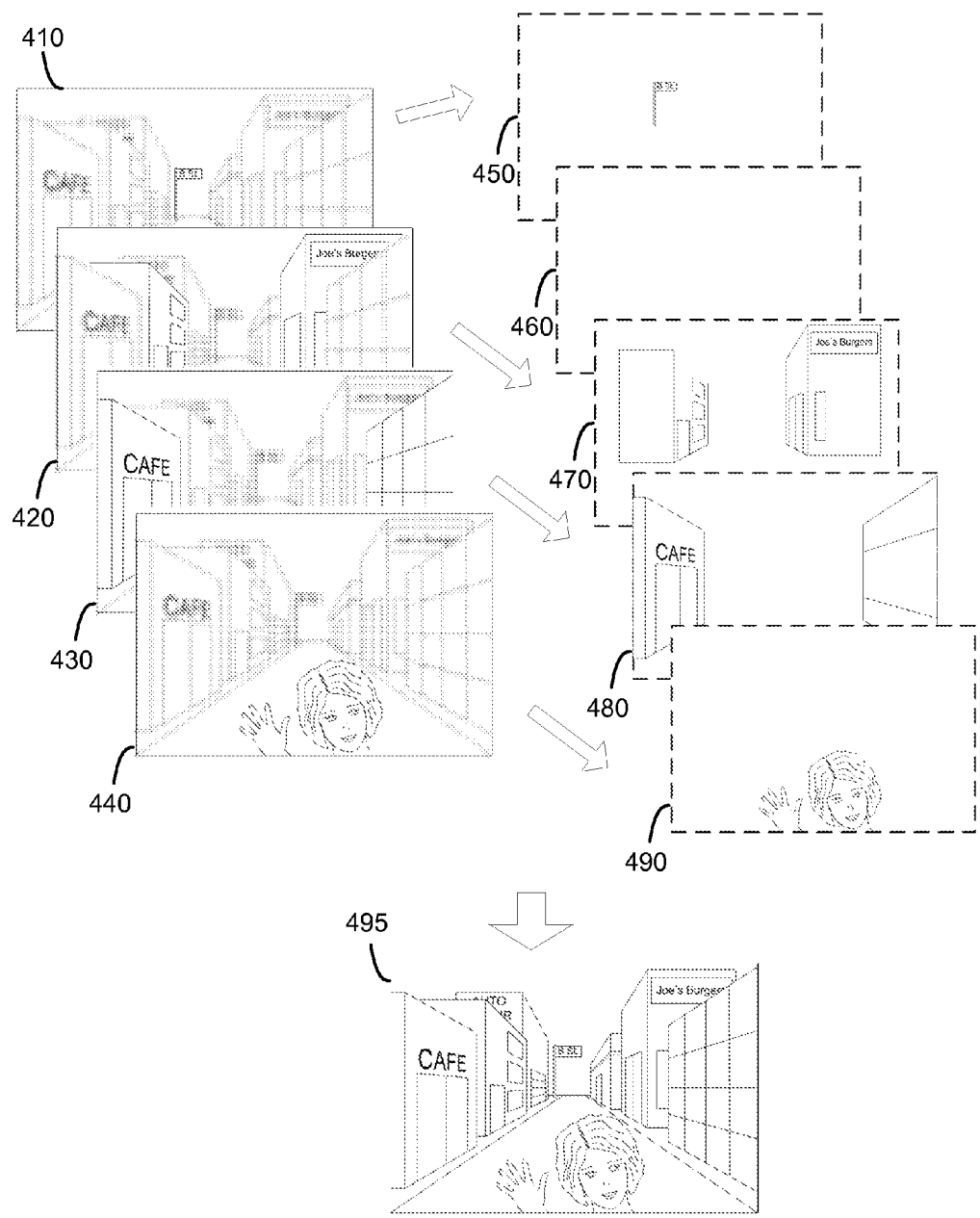
FIG. 4B illustrates a plurality of example images captured by a camera of an example device embodiment at various focus settings for depth determination using camera focus.

In some embodiments, the objects in the plurality of images (e.g., 410, 420, 430, 440) can optionally be "placed" on (e.g., mapped to, associated with, etc.) a plurality of virtual depth planes (e.g., 450, 460, 470, 480, 490) (i.e., virtual planes) as shown in FIG. 4B. In some embodiments, the computing device can optionally generate a plurality of virtual depth planes (e.g., 450, 460, 470, 480, 490) such that each plane representing an area at a particular distance in depth away from the camera. The number of virtual depth planes does not have to equal the number of images; there can be more or less virtual depth planes than images. The computing device can associate (e.g., "place") each of the objects in the plurality of images with an appropriate virtual depth plane depending on the depth information (e.g., depth rank, depth position) associated with each object. In some cases, multiple objects can be placed/mapped onto (associated with) a single virtual depth plane. In some cases, some virtual depth plane can include (be associated with) no objects. In some embodiments, an object (i.e., or a portion thereof) can be associated with a virtual plane by tagging the object (or portion) with information that indicates that the object (or portion) is virtually located at the virtual plane.

In FIG. 4B, there can be four virtual depth planes (i.e., virtual planes), for example. As discussed above, the "B St." sign 312 is the farthest away in depth from the camera. As such, the computing device can place/map the "B St." sign 312 on the virtual depth plane that is farthest away in depth from the camera (e.g., 450). The next farthest away objects are the building 322 and "Joe's Burgers" restaurant 324. Perhaps, the sign 312 can be spaced sufficiently apart in depth from the building 322 and the restaurant 324, such that the next farthest virtual depth plane (e.g., 460) is empty. Instead, the building 322 and the restaurant 324 can be placed onto or associated with the virtual depth plane 470. Next are the "CAFE" 332 and the building 334, which can be associated with the virtual depth plane 480. The closest object to the camera (e.g., "Jane Doe" 342) can be associated with the closest virtual depth plane 490.

In some embodiments, the virtual depth planes (e.g., 450, 460, 470, 480, 490) (i.e., virtual planes) can be utilized to sort the plurality of images and/or the objects in the plurality of images. In some embodiments, the sorting can occur priorly and the generating of the virtual depth planes can depend on the sorting. In some embodiments, the virtual depth planes can be utilized to build a depth map for the images and/or the objects in the images.

In some embodiments, the objects of focus from the plurality of images can be placed together to form an image/rendering (i.e., graphical representation) 495 in which all of these objects are in focus. For example, in some embodiments, all of the objects in the image/rending 495 can be in focus and/or have a sharpness level above a sharpness threshold.

Figure 5:
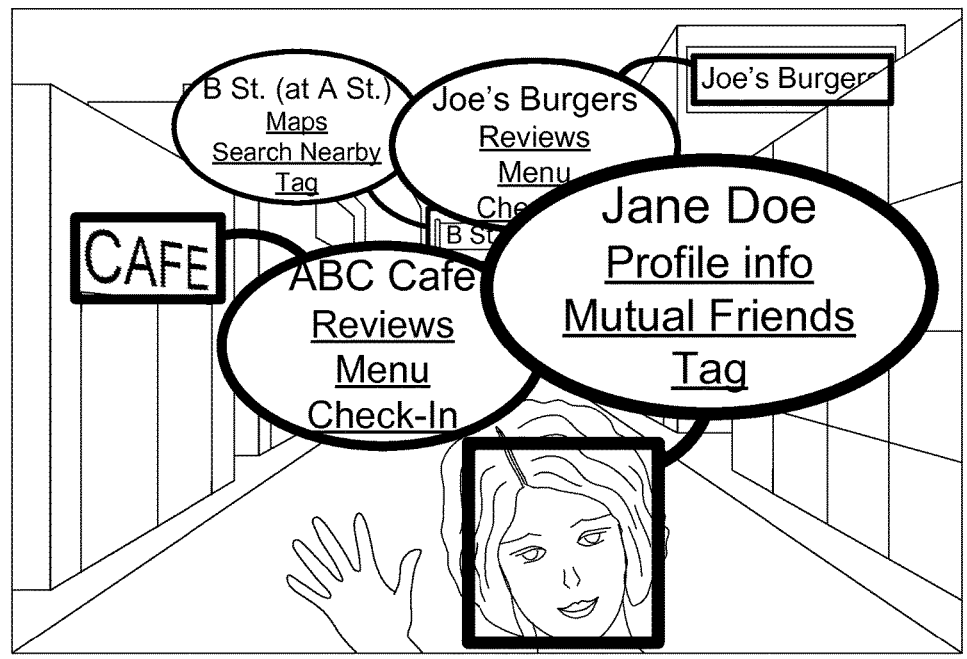
FIG. 5 illustrates an example camera field of view augmented by elements rendered using depth determination using camera focus.

FIG. 5 illustrates an example camera field of view augmented by elements rendered using depth determination using camera focus. FIG. 5 illustrates one example of how depth determination using camera focus can be utilized. The example of FIG. 5 should be taken as being illustrative in nature and not limiting to the scope of the disclosure. It is contemplated that a person of ordinary skill in the art would recognize many other uses for depth determination using camera focus.

In FIG. 5, the computing device can recognize one or more objects, utilizing object recognition technology (including facial detection and/or recognition), within a field of view of the camera of the device. For the recognized objects, the computing device can provide information about the objects. In some embodiments, the computing device can render/display graphical elements on a display screen in conjunction with the objects within the field of view of the camera. Each graphical element can provide information (or access to information) about an object with which the respective element is associated. For example, an element associated with an object can provide a link to information about the object that can be accessed by a user interaction (e.g., tapping on the link).

In some embodiments, the elements can be rendered in accordance with the depths associated with the objects. Rendering multiple elements on the display screen of the device can lead to clutter and/or an inconvenient user interface. As such, based at least in part on the depths associated with the objects, the rendering of the elements can be adjusted. For example, elements associated with objects in the front can occlude and be larger than elements associated with objects in the back, as shown in FIG. 5.

Figure 6A:
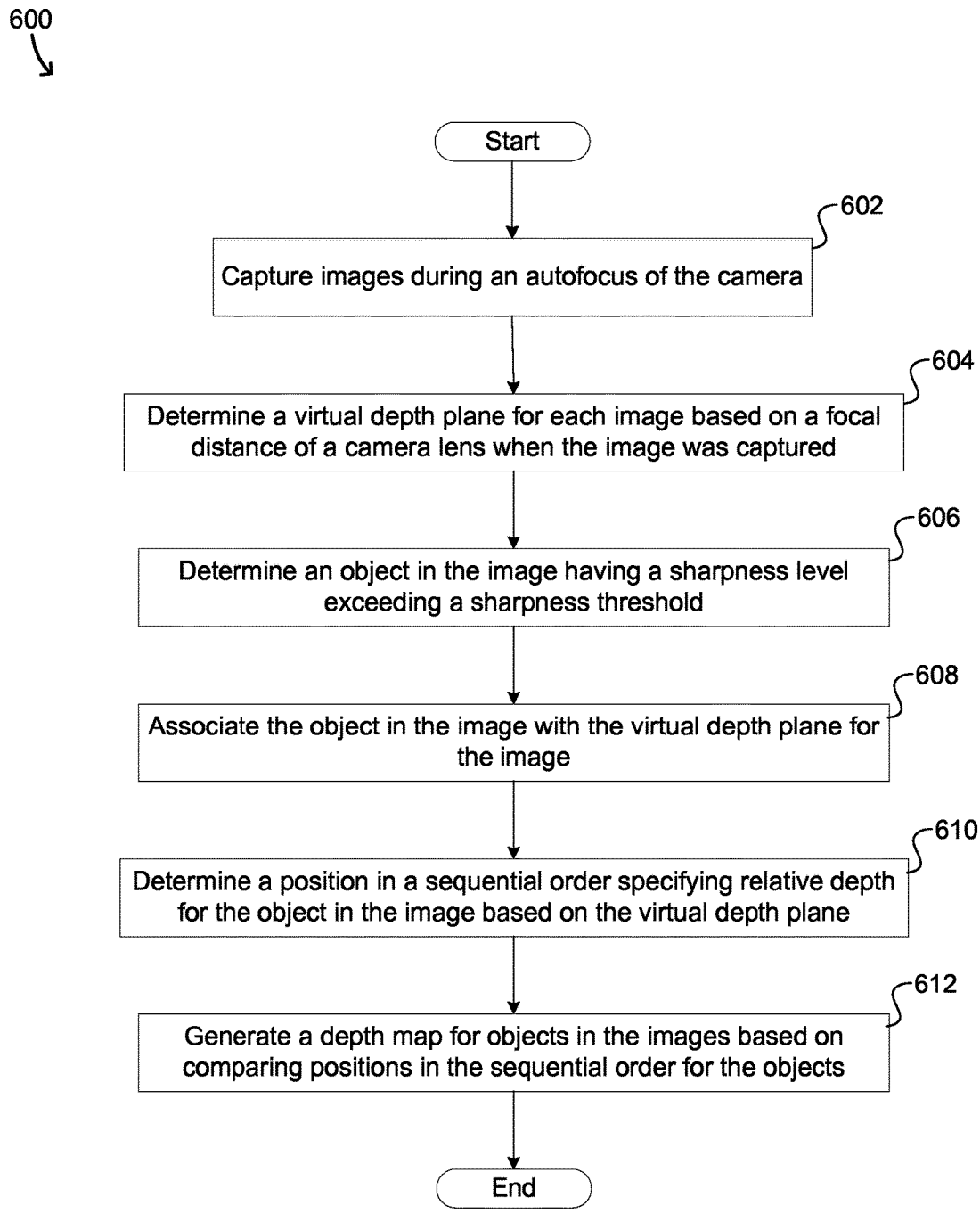
FIG. 6A illustrates an example method embodiment for depth determination using camera focus.

FIG. 6A illustrates an example method embodiment 600 for depth determination using camera focus. It should be understood that there can be additional, fewer, or alternative steps performed in similar or alternative orders, or in parallel, within the scope of the various embodiments unless otherwise stated. In some embodiments, the example method embodiment 600 can start with capturing images during an autofocus of the camera, each image being captured with a different camera focus setting, at step 602. At step 604, the example method 600 can determine a virtual depth plane (i.e., virtual plane) for each image based on a focus distance of a camera lens when the image was captured.

Step 606 can include determining an object in the image having a sharpness level exceeding a sharpness threshold. The method 600 can associate the object in the image with the virtual depth plane for the image, at step 608. Then at step 610, the method 600 can determine a position in a sequential order specifying relative depth for the object in the image based on the virtual depth plane. Step 612 can include generating a depth map for objects in the images based on comparing positions in the sequential order for the objects.

Figure 6B:
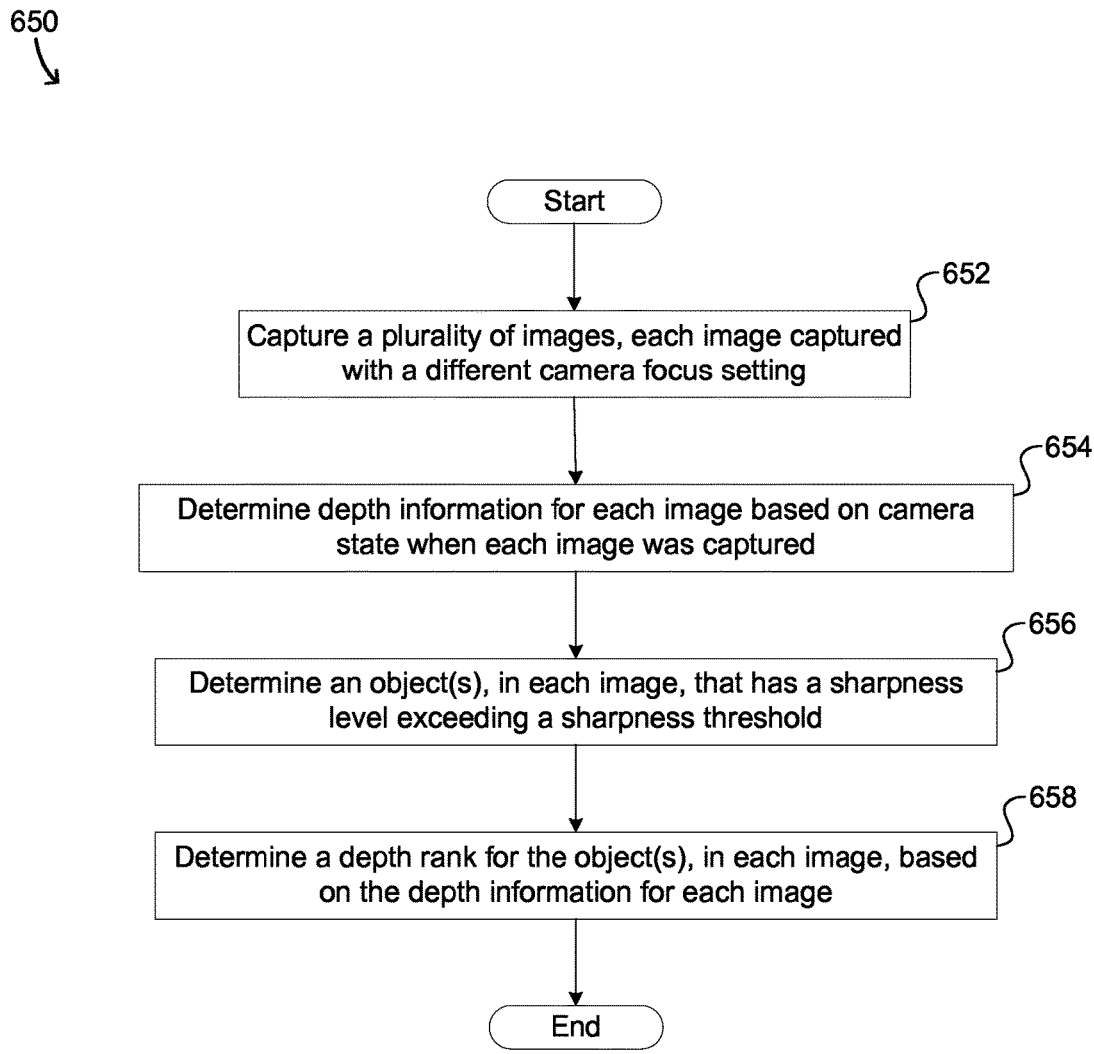
FIG. 6B illustrates an example method embodiment for depth determination using camera focus.

FIG. 6B illustrates an example method embodiment 650 for depth determination using camera focus. Again, it should be understood that there can be additional, fewer, or alternative steps performed in similar or alternative orders, or in parallel, within the scope of the various embodiments unless otherwise stated. At step 652, the example method embodiment 650 can capture a plurality of images, each image captured with a different camera focus setting. Step 654 can include determining depth information for each image using camera state when each image was captured. Step 656 can include determining an object(s), in each image, that has a sharpness level exceeding a sharpness threshold. The example method embodiment 650 can determine a depth rank for the object(s), in each image, based on the depth information for each image, at step 658.

In some embodiments, the computing device can rank the plurality of images (i.e., rank the objects in the plurality of images) based on depth. For example, the computing device can determine that out of the plurality of images captured (e.g., 310, 320, 330, 340), the object(s) of focus in the image associated with the farthest depth (e.g., "B St." sign 312 in image 310) can have the highest depth rank, such as being first in a sequential order that ranks the objects in the images from farthest away from the camera to the closet. The object(s) of focus in the image associated with the next farthest depth (e.g., building 322 and "Joe's Burgers" restaurant 324 in image 320) can have the next highest depth rank (e.g., ranked second from farthest in depth to closest). Similarly, "CAFE" 332 and building 334 in image 330 can have the third highest depth rank. Finally, in this example, it would follow that "Jane Doe" 342 in image 340 can have the last depth rank, indicating that "Jane Doe" 342 is closest to the camera.

In some embodiments, the computing device can generate a depth map which indicates relative depths for the objects in the plurality of images. For example, the depth map can indicate locations of the objects in a field of view of the camera and indicating relative positions of depth for the objects. In some embodiments, the depth map can be generated based in part on comparing positions in a sequential order of depth (e.g., depth ranks) for the objects. In some embodiments, the depth map can be generated for a plurality of fields of view of the camera joined together.

In some embodiments, one or more orientation sensors of the computing device can be utilized at least in part to determine a direction at which the camera of the device is pointed. The generating of the depth map can be based at least in part on the direction at which the camera is pointed. The one or more orientation sensors can include (but is not limited to) an accelerometer, a gyroscope, an electronic compass, or a magnetometer.

In some embodiments, if a depth cannot be determined for an object, then the depth for the object can be estimated from the depth of a nearby object. For example, if the confidence of the depth determination for an object is low, then the determining of the depth for the object can include utilizing at least in part a determined a depth for an object within an allowable distance of the former object.

In some embodiments, identifying an object(s), in each of the plurality of images, that has a sharpness score (i.e., sharpness level) exceeding a sharpness score threshold (i.e., sharpness level threshold, sharpness threshold) can be based on at least one of rise distance evaluation, contrast evaluation (e.g., increase resolution and evaluate contrast), fractal dimension evaluation, edge detection, line detection, shadow detection, feature detection, and/or other suitable image processing algorithms.

In some embodiments, information about an object can be retrieved via a network from a server external to the computing device. In some embodiments, at least some of the processing performed by the computing device can be performed by the server instead.

Various embodiments consistent with the present disclosure can also be implemented with additional or alternative depth sensors. In some embodiments, at least two cameras of the computing device can be utilized at least in part to facilitate depth determination. For example, the at least two cameras can be utilized for stereoscopic imaging, which can aid in the depth determination. In some embodiments, the plurality of images can be captured using multiple cameras, wherein each camera has a different focus setting. In some embodiments, depth sensors related to sonar, infrared, etc., can be utilized to confirm and/or improve the depth determination.

Figure 7:
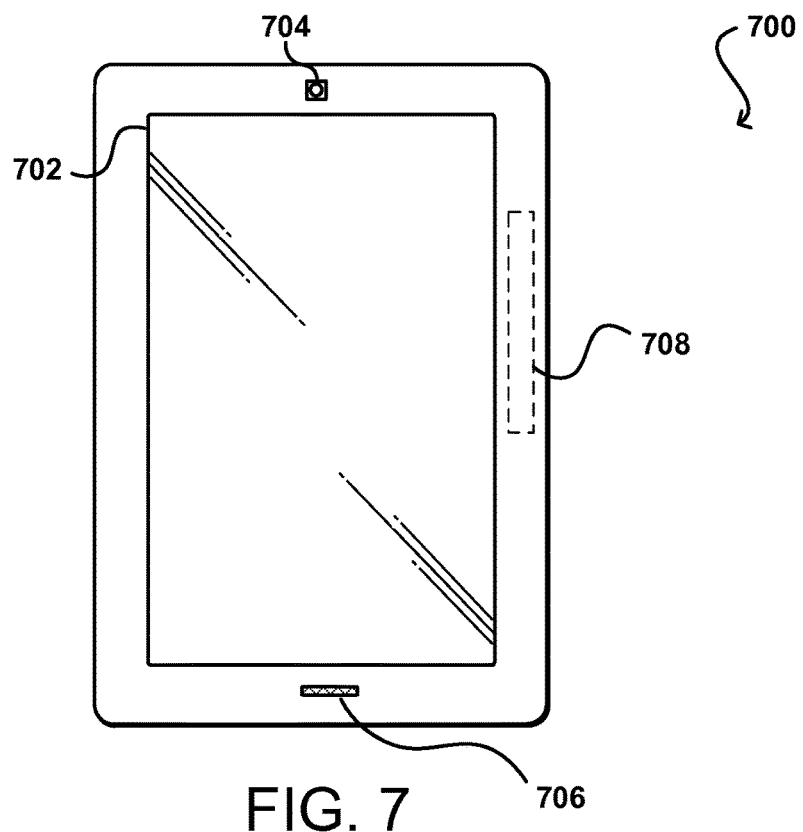
FIG. 7 illustrates an example device that can be used to implement aspects of the various embodiments.

FIG. 7 illustrates an example electronic user device 700 that can be used in accordance with various embodiments. Although a portable computing device (e.g., an electronic book reader or tablet computer) is shown, it should be understood that any electronic device capable of receiving, determining, and/or processing input can be used in accordance with various embodiments discussed herein, where the devices can include, for example, desktop computers, notebook computers, personal data assistants, smart phones, video gaming consoles, television set top boxes, and portable media players. In some embodiments, a computing device can be an analog device, such as a device that can perform signal processing using operational amplifiers. In this example, the computing device 700 has a display screen 702 on the front side, which under normal operation will display information to a user facing the display screen (e.g., on the same side of the computing device as the display screen). The computing device in this example includes at least one camera 704 or other imaging element for capturing still or video image information over at least a field of view of the at least one camera. In some embodiments, the computing device might only contain one imaging element, and in other embodiments the computing device might contain several imaging elements. Each image capture element may be, for example, a camera, a charge-coupled device (CCD), a motion detection sensor, or an infrared sensor, among many other possibilities. If there are multiple image capture elements on the computing device, the image capture elements may be of different types. In some embodiments, at least one imaging element can include at least one wide-angle optical element, such as a fish eye lens, that enables the camera to capture images over a wide range of angles, such as 180 degrees or more. Further, each image capture element can comprise a digital still camera, configured to capture subsequent frames in rapid succession, or a video camera able to capture streaming video.

The example computing device 700 also includes at least one microphone 706 or other audio capture device capable of capturing audio data, such as words or commands spoken by a user of the device. In this example, a microphone 706 is placed on the same side of the device as the display screen 702, such that the microphone will typically be better able to capture words spoken by a user of the device. In at least some embodiments, a microphone can be a directional microphone that captures sound information from substantially directly in front of the microphone, and picks up only a limited amount of sound from other directions. It should be understood that a microphone might be located on any appropriate surface of any region, face, or edge of the device in different embodiments, and that multiple microphones can be used for audio recording and filtering purposes, etc.

The example computing device 700 also includes at least one orientation sensor 708, such as a position and/or movement-determining element. Such a sensor can include, for example, an accelerometer or gyroscope operable to detect an orientation and/or change in orientation of the computing device, as well as small movements of the device. An orientation sensor also can include an electronic or digital compass, which can indicate a direction (e.g., north or south) in which the device is determined to be pointing (e.g., with respect to a primary axis or other such aspect). An orientation sensor also can include or comprise a global positioning system (GPS) or similar positioning element operable to determine relative coordinates for a position of the computing device, as well as information about relatively large movements of the device. Various embodiments can include one or more such elements in any appropriate combination. As should be understood, the algorithms or mechanisms used for determining relative position, orientation, and/or movement can depend at least in part upon the selection of elements available to the device.

Figure 8:
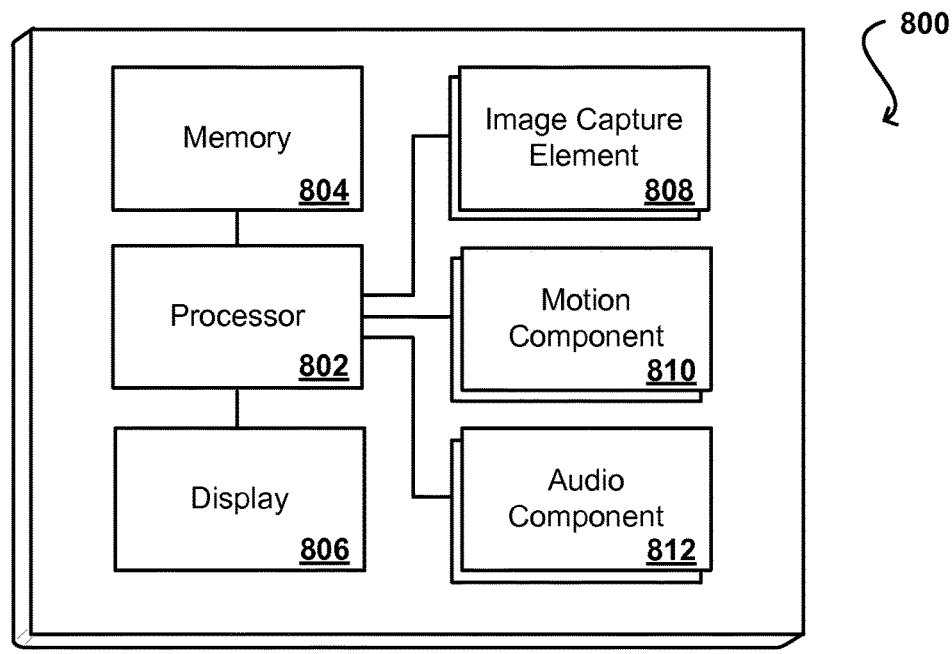
FIG. 8 illustrates example components of a client device such as that illustrated in FIG. 7.

FIG. 8 illustrates a logical arrangement of a set of general components of an example computing device 800 such as the device 700 described with respect to FIG. 7. In this example, the device includes a processor 802 for executing instructions that can be stored in a memory device or element 804. As would be apparent to one of ordinary skill in the art, the device can include many types of memory, data storage, or non-transitory computer-readable storage media, such as a first data storage for program instructions for execution by the processor 802, a separate storage for images or data, a removable memory for sharing information with other devices, etc. The device typically will include some type of display element 806, such as a touch screen or liquid crystal display (LCD), although devices such as portable media players might convey information via other means, such as through audio speakers. As discussed, the device in many embodiments will include at least one image capture element 808 such as a camera or infrared sensor that is able to image projected images or other objects in the vicinity of the device. Methods for capturing images or video using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device. The example device similarly includes at least one audio capture component 812, such as a mono or stereo microphone or microphone array, operable to capture audio information from at least one primary direction. A microphone can be a uni-or omni-directional microphone as known for such devices.

In some embodiments, the computing device 800 of FIG. 8 can include one or more communication elements (not shown), such as a Wi-Fi, Bluetooth, RF, wired, or wireless communication system. The device in many embodiments can communicate with a network, such as the Internet, and may be able to communicate with other such devices. In some embodiments the device can include at least one additional input device able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

The device 800 also can include at least one orientation or motion sensor 810. As discussed, such a sensor can include an accelerometer or gyroscope operable to detect an orientation and/or change in orientation, or an electronic or digital compass, which can indicate a direction in which the device is determined to be facing. The mechanism(s) also (or alternatively) can include or comprise a global positioning system (GPS) or similar positioning element operable to determine relative coordinates for a position of the computing device, as well as information about relatively large movements of the device. The device can include other elements as well, such as may enable location determinations through triangulation or another such approach. These mechanisms can communicate with the processor 802, whereby the device can perform any of a number of actions described or suggested herein.

As an example, a computing device such as that described with respect to FIG. 7 can capture and/or track various information for a user over time. This information can include any appropriate information, such as location, actions (e.g., sending a message or creating a document), user behavior (e.g., how often a user performs a task, the amount of time a user spends on a task, the ways in which a user navigates through an interface, etc.), user preferences (e.g., how a user likes to receive information), open applications, submitted requests, received calls, and the like. As discussed above, the information can be stored in such a way that the information is linked or otherwise associated whereby a user can access the information using any appropriate dimension or group of dimensions.

Figure 9:
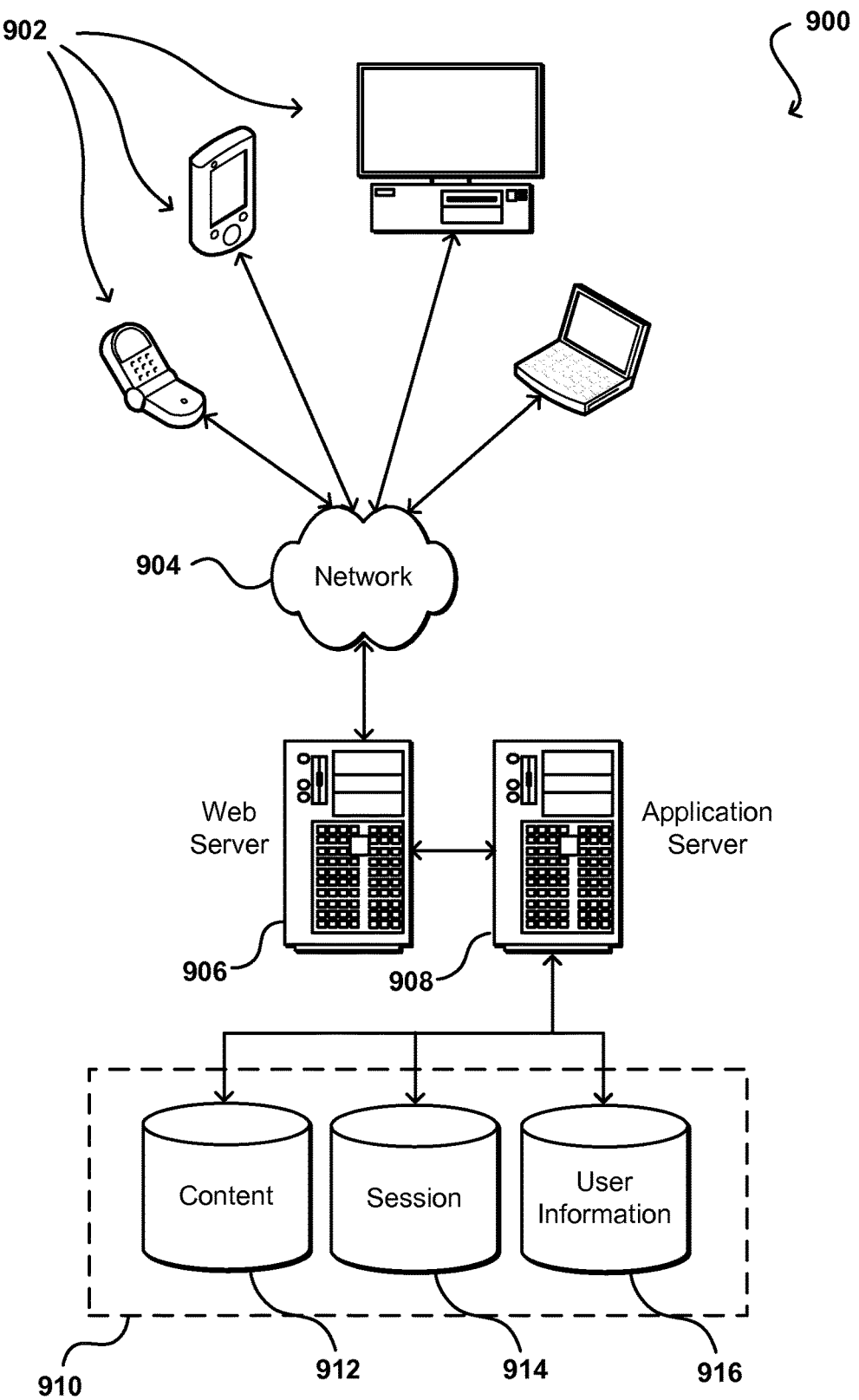
FIG. 9 illustrates an environment in which various embodiments can be implemented.

As discussed, different approaches can be implemented in various environments in accordance with the described embodiments. For example, FIG. 9 illustrates an example of an environment 900 for implementing aspects in accordance with various embodiments. As will be appreciated, although a Web-based environment is used for purposes of explanation, different environments may be used, as appropriate, to implement various embodiments. The system includes an electronic client device 902, which can include any appropriate device operable to send and receive requests, messages or information over an appropriate network 904 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 906 for receiving requests and serving content in response thereto, although for other networks an alternative device serving a similar purpose could be used, as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 902 and the application server 908, can be handled by the Web server 906. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing production data 912 and user information 916, which can be used to serve content for the production side. The data store also is shown to include a mechanism for storing log or session data 914. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of element. In this case, the data store might access the user information to verify the identity of the user and can access the catalog detail information to obtain information about elements of that type. The information can then be returned to the user, such as in a results listing on a Web page that the user is able to view via a browser on the user device 902. Information for a particular element of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising: capturing a first image at a first focus setting using a camera of a computing device; capturing a second image at a second focus setting using the camera; identifying, in the first image, a first portion of an object, wherein the first portion has a first sharpness score that exceeds a sharpness threshold, the sharpness threshold indicating an amount of image detail conveyed; identifying, in the second image, a second portion of the object, the second portion having an associated second sharpness score that exceeds the sharpness threshold; determining first depth information for the first image based at least in part on the first focus setting; determining second depth information for the second image based at least in part on the second focus setting; determining a relative depth for the object based on the first depth information and the second depth information; and generating a depth map indicating a location of the object in a field of view of the camera and indicating relative positions for other objects in the field of view of the camera.

2. The computer-implemented method of claim 1, wherein the first depth information and the second depth information includes a position of the object within a field of view of the camera.

3. The computer-implemented method of claim 1, wherein the first depth information and the second depth information comprises a relative depth of the object within a field of view of the camera.

4. The computer-implemented method of claim 1, further comprising: generating a graphical element indicating the relative depth for the object.

5. The computer-implemented method of claim 1, further comprising: generating a depth map for the object based on the relative depth of the object.

6. The computer-implemented method of claim 1, further comprising: identifying, in the first image, a third portion of a second object; identifying, in the second image, a fourth portion of the second object; determining third depth information for the second object in the first image based at least in part on the first focus setting; determining fourth depth information for the second object in the second image based at least in part on the second focus setting; determining a second relative depth for the second portion of the second object based on the third depth information and the fourth depth information; and generating a depth map for the object and the second object, the depth map indicating the relative depth for the object and the second relative depth for the second object with respect to the camera.

7. The computer-implemented method of claim 1, further comprising: associating the object with a virtual plane, the virtual plane being selected based on a focus distance of a lens of the camera, the virtual plane indicating a depth away from the camera at which the object is located.

8. The method of claim 1, wherein determining a relative depth for the object based on the first depth information and the second depth information comprises determining a position specifying relative depth for the object in the first image as sequentially compared to the second image.

9. A computer-implemented method, comprising: capturing a first image at a first focus setting using a camera of a computing device; capturing a second image at a second focus setting using the camera; identifying, in a first portion of the first image, a first object, wherein the first portion has a first sharpness score that exceeds a sharpness threshold, the sharpness threshold indicating an amount of detail conveyed; identifying, in a second portion of the second image, a second object, wherein the second portion has a second sharpness score that exceeds the sharpness threshold; determining first depth information for the first image based at least in part on the first focus setting; determining second depth information for the second image based at least in part on the second focus setting; determining a depth of the first object relative to the second object based on the first depth information and the second depth information; and generating a depth map indicating a location of the first object in a field of view of the camera and indicating relative positions for other objects in the field of view of the camera.

10. The computer-implemented method of claim 9, further comprising: generating the depth map by comparing the first depth information and the second depth information in sequential order for the first object, and specifying relative depth for the first object in each image.

11. The computer-implemented method of claim 9, further comprising: generating a plurality of depth maps for each of a plurality of fields of view of the camera based on the first depth information and the second depth information; and joining each of the plurality of depth maps together to form a single depth map.

12. The computer-implemented method of claim 9, further comprising: associating the first object with a virtual plane; and displaying a graphical representation on the virtual plane of a depth of the first object relative to the second object, wherein the first object rendered in the graphical representation is capable of occluding other objects rendered in the graphical representation that are positioned farther away from the camera.

13. A computing device comprising: a camera; a processor; and a memory including instructions that, when executed by the processor, cause the computing device to: capture a first image at a first focus setting using the camera; capture a second image at a second focus setting using the camera; identify, in the first image, a first portion of an object, wherein the first portion has a first sharpness score that exceeds a sharpness threshold, the sharpness threshold indicating an amount of image detail conveyed; identify, in the second image, a second portion of the object in the second image, the second portion having an associated second sharpness score that exceeds the sharpness threshold; determine first depth information for the first image based at least in part on the first focus setting; determine second depth information for the second image based at least in part on the second focus setting; determine a relative depth for the object based on the first and the second depth information; and generating a depth map indicating a location of the object in a field of view of the camera and indicating relative positions for other objects in the field of view of the camera.

14. The computing device of claim 13, wherein the first depth information and the second depth information includes one of: a position of the object within a field of view of the camera, or a relative depth of the object with respect to the first image and the second image.

15. The computing device of claim 13, wherein the instructions further cause the computing device to: generate the depth map by comparing the first depth information and the second depth information in sequential order for the object, and specifying relative depth for the object in each image.

16. The computing device of claim 13, wherein the instructions further cause the computing device to: generate a plurality of depth maps for each of a plurality of fields of view of the camera based on the first depth information and the second depth information; and joining each of the plurality of depth maps together to form a single depth map.

17. The computing device of claim 13, wherein the instructions further cause the computing device to: associate the object with a virtual plane; and display a graphical representation of the relative depth of the object on the virtual plane, wherein the object rendered in the graphical representation is capable of occluding other objects rendered in the graphical representation that are positioned farther away from the camera.

18. The computing device of claim 17, wherein the instructions further cause the computing device to: detect a user interaction with the graphical representation, the user interaction indicating an interaction to scroll the graphical representation; and scroll the graphical representation based at least in part on the user interaction, wherein occluded objects are able to be viewed.

* * * * *